(12) United States Patent
Krull

(10) Patent No.: US 12,303,817 B2
(45) Date of Patent: May 20, 2025

(54) AIR FILTER WITH IMPROVED HANDLE

(71) Applicant: Timothy L Krull, Kearney, NE (US)

(72) Inventor: Timothy L Krull, Kearney, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 868 days.

(21) Appl. No.: 17/350,429

(22) Filed: Jun. 17, 2021

(65) Prior Publication Data

US 2021/0308613 A1    Oct. 7, 2021

Related U.S. Application Data

(63) Continuation of application No. PCT/US2020/021161, filed on Mar. 5, 2020.

(60) Provisional application No. 62/851,357, filed on May 22, 2019, provisional application No. 62/815,387, filed on Mar. 8, 2019.

(51) Int. Cl.
*B01D 46/42* (2006.01)
*B01D 46/00* (2022.01)
*B01D 46/52* (2006.01)

(52) U.S. Cl.
CPC ..... *B01D 46/4227* (2013.01); *B01D 46/0005* (2013.01); *B01D 46/52* (2013.01); *B01D 2265/06* (2013.01)

(58) Field of Classification Search
CPC ............ B01D 46/4227; B01D 46/0005; B01D 46/52; B01D 2265/06
See application file for complete search history.

(56) References Cited

U.S. PATENT DOCUMENTS

| | | |
|---|---|---|
| 1,002,587 A | 9/1911 | Kiefer |
| 2,731,155 A | 1/1956 | James |
| 2,739,667 A | 3/1956 | Palmore |
| 2,771,154 A | 11/1956 | Gonzalez |
| 5,556,440 A | 9/1996 | Mullins et al. |
| 6,235,195 B1 | 5/2001 | Tokar |
| 6,517,598 B2 | 2/2003 | Anderson et al. |
| 6,610,126 B2 | 8/2003 | Xu et al. |
| 6,852,141 B2 | 2/2005 | Bishop et al. |
| 6,878,190 B1 | 4/2005 | Xu et al. |
| 6,966,940 B2 | 11/2005 | Krisko et al. |
| 6,997,968 B2 | 2/2006 | Xu et al. |
| 7,261,756 B2 | 8/2007 | Merritt |
| 7,318,851 B2 | 1/2008 | Brown et al. |

(Continued)

FOREIGN PATENT DOCUMENTS

| | | |
|---|---|---|
| DE | 102005031058 A1 | 1/2007 |
| DE | 102016001132 A1 | 8/2017 |

(Continued)

OTHER PUBLICATIONS

Donaldson; Air-Intake-Systems-Product-Guide; https://www.donaldson.com/content/dam/donaldson/engine-hydraulics-bulk/catalogs/air-intake/north-america/F110027-ENG/Air-Intake-Systems-Product-Guide.pdf: pp. 1-42; Known to the applicant on or before Mar. 20, 2019.

*Primary Examiner* — Youngsul Jeong
(74) *Attorney, Agent, or Firm* — Reinhart Boerner Van Deuren P.C.

(57) ABSTRACT

An air filter has handle structures at the periphery that may either be handles or handle mounts that may support a bail handle. The handle structures may be part of a seal support frame structure such that force is applied during mechanic handling is applied proximate the seal region.

33 Claims, 5 Drawing Sheets

(56) References Cited

U.S. PATENT DOCUMENTS

| | | |
|---|---|---|
| 7,323,029 B2 | 1/2008 | Engelland et al. |
| 7,393,375 B2 | 7/2008 | Xu et al. |
| 7,396,375 B2 | 7/2008 | Nepsund et al. |
| 7,625,419 B2 | 12/2009 | Nelson et al. |
| 7,674,308 B2 | 3/2010 | Krisko et al. |
| 7,691,166 B2 | 4/2010 | Xu et al. |
| 7,708,797 B2 | 5/2010 | Kuempel et al. |
| 7,736,410 B2 | 6/2010 | Kuempel et al. |
| 7,905,936 B2 | 3/2011 | Coulonvaux et al. |
| 7,931,725 B2 | 4/2011 | Wydeven et al. |
| 7,976,601 B2 | 7/2011 | Xu et al. |
| 8,012,233 B2 | 9/2011 | Kuempel et al. |
| 8,016,903 B2 | 9/2011 | Nelson et al. |
| 8,048,188 B2 | 11/2011 | Widerski et al. |
| 8,246,707 B2 | 8/2012 | Xu et al. |
| 8,277,531 B2 | 10/2012 | Brown et al. |
| 8,361,182 B2 | 1/2013 | Belcher et al. |
| 8,608,818 B2 | 12/2013 | Xu et al. |
| 8,628,663 B2 | 1/2014 | Richmond et al. |
| 8,915,985 B2 | 12/2014 | Dewit et al. |
| 9,511,318 B2 | 12/2016 | Sorger et al. |
| 9,675,225 B2 | 6/2017 | Williams et al. |
| 10,046,260 B2 | 8/2018 | Campbell et al. |
| 2002/0184864 A1 | 12/2002 | Bishop et al. |
| 2008/0110811 A1 | 5/2008 | Brown et al. |
| 2009/0014375 A1 | 1/2009 | Savage et al. |
| 2010/0011532 A1 | 1/2010 | Norton et al. |
| 2010/0132321 A1* | 6/2010 | Nepsund ............... B01D 46/521 29/428 |
| 2010/0293906 A1 | 11/2010 | Flagstad et al. |
| 2012/0223003 A1 | 9/2012 | Richmond et al. |
| 2014/0338294 A1 | 11/2014 | Xu et al. |
| 2015/0013282 A1* | 1/2015 | Sorger ................ B01D 46/521 55/357 |
| 2018/0008923 A1 | 1/2018 | Burton et al. |
| 2019/0299148 A1 | 10/2019 | Dexter et al. |

FOREIGN PATENT DOCUMENTS

| | | | |
|---|---|---|---|
| EP | 2185051 B1 * | 5/2014 | ............... A47L 9/10 |
| GB | 2299769 A | 10/1996 | |
| GB | 2299769 B | 10/1998 | |
| WO | WO 2006/009766 A1 | 1/2006 | |
| WO | WO 2006/014941 A2 | 2/2006 | |

* cited by examiner

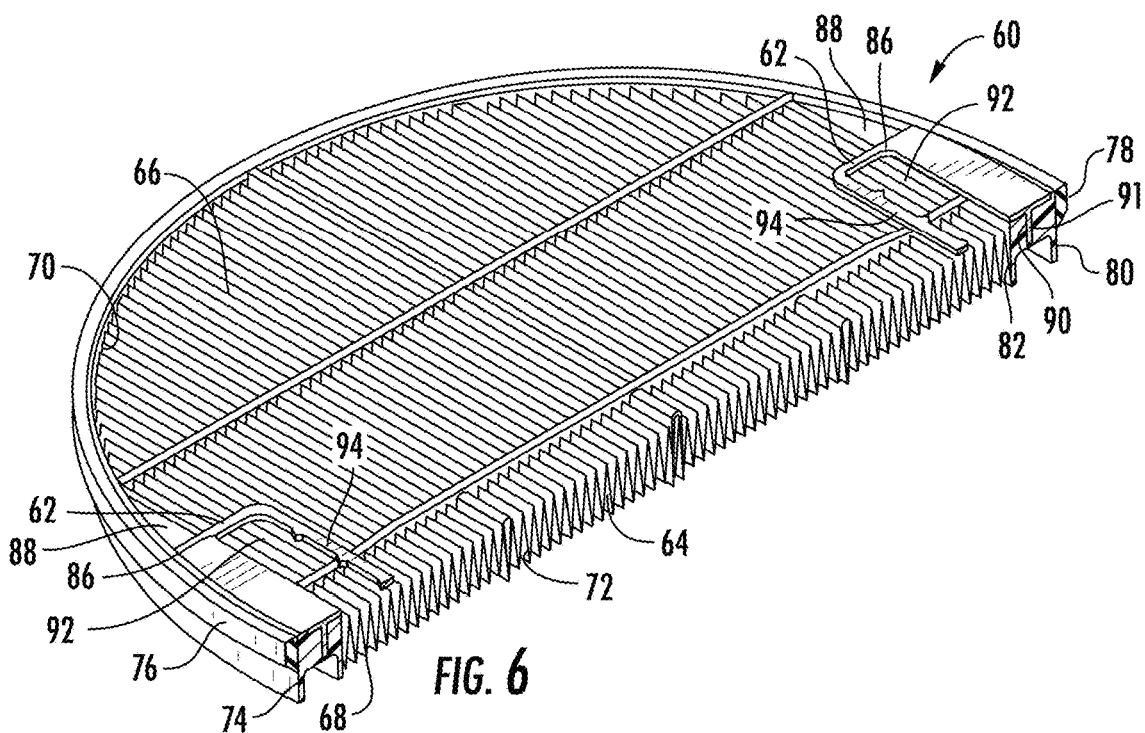
FIG. 6
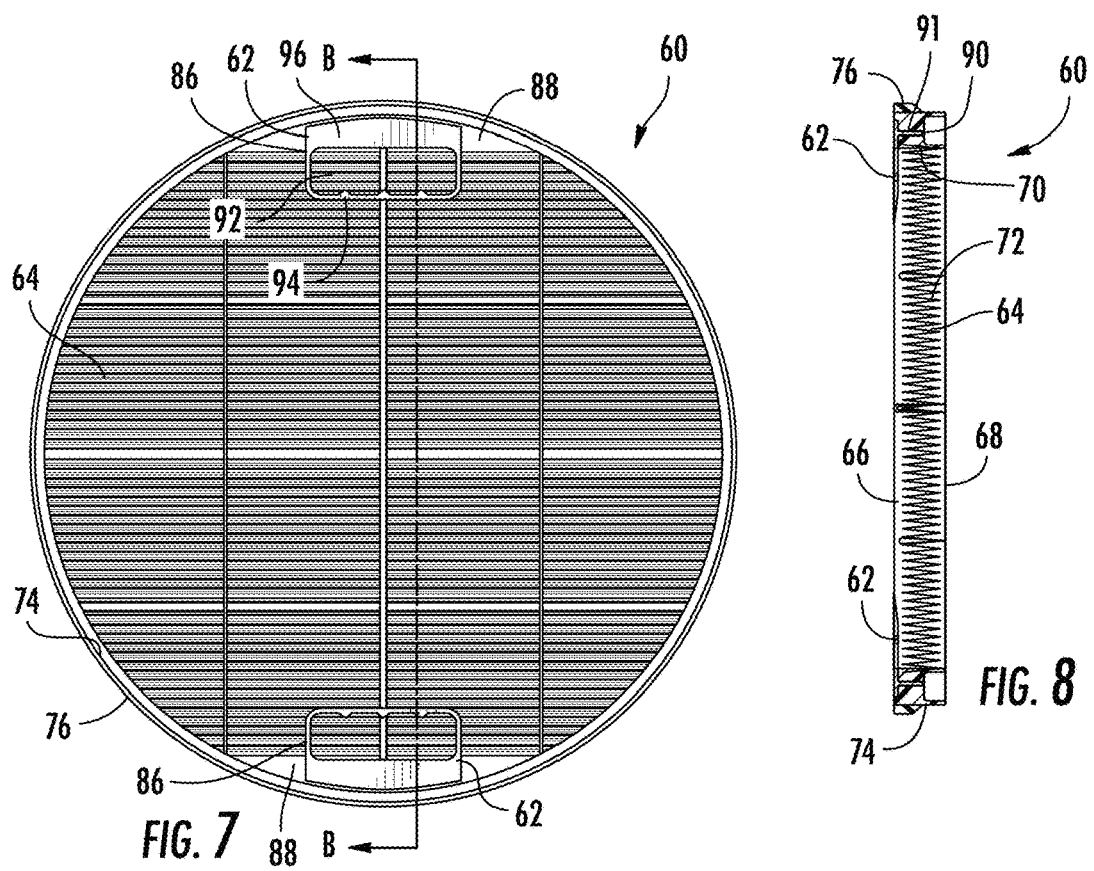
FIG. 7
FIG. 8
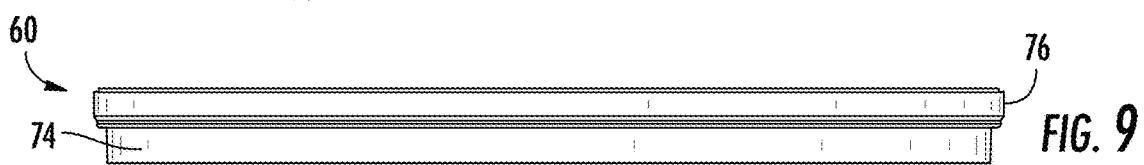
FIG. 9

AIR FILTER WITH IMPROVED HANDLE

CROSS-REFERENCE TO RELATED PATENT APPLICATIONS

This patent application is a continuation of co-pending U.S. PCT Patent Application No. PCT/US2020/021161, filed Mar. 5, 2020; the entire teachings and disclosure of which are incorporated herein by reference thereto. This patent application also claims benefit to U.S. Provisional Patent Application No. 62/815,387, filed Mar. 8, 2019 and U.S. Provisional Patent Application No. 62/851,357, filed May 22, 2019; the entire teachings and disclosure of each of these provisional applications are also incorporated herein by reference thereto

FIELD OF THE INVENTION

This invention generally relates to air filters, and more particularly to the handle structures of such air filters for manipulation and/or arrangement in an air cleaner.

BACKGROUND OF THE INVENTION

An example of an air filter product utilizes a small, plastic projection that snaps into the center winding core for grasping to pull the filter out of sealing engagement with the housing, such as show in U.S. Pat. Nos. 6,852,141 and 6,610,126 to Xu et al., which are incorporated by reference in their entirety as the present embodiments herein may be for same air cleaner housing applications as replacements, such that dimensions, filter packs and housings disclosed therein are useable for the present embodiments. As shown in these patents, the grasping structure is small in relation to the size of the filter. The strength of the snap-fit attachment of the grasping projection may be less than necessary to lift or remove a filter (with or without retained contaminant). If the grasping projection breaks away, it cannot be repaired/replaced leading to significant customer dissatisfaction. The location and shape of the grasping projection is not considered 'user-friendly' by the customer.

Another concept is illustrated in U.S. Pat. No. 8,083,825 to Mosset et al. entitled "Filter arrangement and method", which is incorporated by reference in their entirety as the present embodiments herein may be for same air cleaner housing applications as replacements, such that dimensions, filter packs and housings disclosed therein are useable for the present embodiments. In this '825 patent, a similar axial flow (inline type flow) air filter pack such as a fluted pack is used, and a flat radially projecting outer flange is discussed as providing a handle, however this acts primarily as a housing stop.

As will be realized by the present invention, improvements over the state of the art may be realized, with an improved handle structure.

Other examples in the filter art that include handles are shown in U.S. Pat. Nos. 1,002,587; 2,739,667; 2,731,155; 6,878,190; 6,997,968; 7,393,375; 7,691,166; 7,976,601; 8,246,707; 8,608,818; and 6,852,141 along with US Publication 2014/0338294 and GB 2,299,769. However, some of these are not concerned with similar concerns or not for air filters, or have other drawbacks with respect to occupying extra space and/or considerable space, increasing the size of the filter envelope occupied.

BRIEF SUMMARY OF THE INVENTION

As noted above, the air filter elements according to the various embodiments disclosed herein may be used as replacement filters in the air cleaner housings such as disclosed in U.S. Pat. No. 6,610,126 to Xu et al and/or U.S. Pat. No. 8,083,825 to Mosset et al. For example, the handle structure may also engage the air cleaner housing according to the patent records, to help with filter positioning.

According to air filter embodiments relating to a primary air filter element, a pair of handle structures are provided integral with the dust seal frame. The handle structures can be located along the perimeter of the filter on opposite sides, and are sized large enough for grasping by work-gloved hands. The handles can be molded unitarily, in one piece with the outer frame, and are of a material (e.g., glass fiber-reinforced nylon such as nylon 66) and thickness to withstand end-use environment (e.g., oil field power generation and/or other large diesel combustion engines).

One inventive aspect is directed toward an air filter element with handles. The air filter element comprises a filter media pack comprising an air filter media and having an inlet face, an outlet face and an outer periphery, with the outer periphery extending between the inlet face and the outlet face and a filtered fluid flow path extending axially from the inlet face to the outlet face and through the air filter media for contaminant removal. A frame is secured to the filter media pack and in surrounding relation of the outer periphery. A gasket is arranged in surrounding relation of the filter media pack. A plurality of handle structures are secured to the frame proximate the outer periphery, with the handle structures extending to a region inside of an outer perimeter of the gasket, and with the handle structures being at least one of: (a) primarily contained between the inlet face and the outlet face and (b) lying substantially flat with the inlet face.

Another inventive aspect is directed toward a filter element with a pair of handles. The filter element includes i) a mass of media (preferably a pleat pack or fluted pack) having an inlet face at one end and an outlet face at another end, and ii) a rigid frame fixed to and circumferentially surrounding the media around the outer periphery thereof. The frame includes an annular body portion and a pair of handles formed integrally with the body portion and projecting freely from the body portion toward or across one of the ends of the element. The handles are located and sized for grasping by a user to remove the element from a housing.

Another inventive aspect is directed toward a filter element with a dust seal assembly including at least one handle structure. The filter element includes i) a mass of media having an inlet face at one end and an outlet face at another end and surrounding a central core, and ii) a dust seal assembly circumferentially surrounding the element along an outer surface thereof. The dust seal assembly includes a rigid frame fixed to the surface, and at least one handle structure formed integrally with an annular body portion of the frame and projecting freely from the body portion toward one of the ends of the element.

Another inventive aspect is directed toward a filter element with at least one handle structure configuration. The filter element includes i) a mass of media having an inlet face at one end and an outlet face at another end, and ii) a gasket assembly circumferentially surrounding the element along an outer surface thereof. The gasket assembly includes a rigid frame fixed to and supporting the element, and at least one handle formed integrally with an annular body portion of the frame and projecting freely from the body portion across one of the ends of the element. The at least one handle is located and sized for grasping by a user to remove the element from a housing.

Various features may be employed with these or other aspects either alone or in combination with each other as summarized below.

The handle structures may be primarily contained between the inlet face and the outlet face.

A top of the handle structures may be generally flush with the inlet face.

The handle structures may lie substantially flat with the inlet face and extend across the inlet face, with the handle structures comprise pivotable handles secured integral with the frame, and with the handles being sufficiently thin and flexible to provide an integral hinge.

The handle structures can be interposed in an annular region between the gasket and the filter media pack and extend axially along the outer periphery generally parallel therewith and in spaced relation to the filter media pack with an air gap therebetween (with "generally parallel" being parallel or within 20 degrees of parallel).

A portion of the handle structure may generally flush with the inlet face (with "generally flush" being flush or within 2 centimeters of being flush).

The top of the handle structure may provide mechanical stop means for proper installing and positioning of the air filter element, such as with a filter air cleaner.

The handle structures may be in the form a handle defining an aperture having a length of between 5 and 20 centimeters and a width of between 2 and 10 centimeters to provide for manual grasping manipulation.

The handle structures may instead be a pair of handle mounts including support ears extending from an annular band of the frame, and further with a bail handle pivotably mounted to the pair support ears.

Such bail handle may be pivotable between an extended position providing a loop over the inlet face for manual manipulation and a retracted position in which the bail handle is generally flush or below the inlet face. Preferably, an annular clearance region is defined radially between the frame and the filter media pack, wherein the bail handle in the retracted position occupies the annular clearance region, and wherein the bail handle comprises a pair of projections snap fit into respective apertures of the support ears.

Preferably, the handle structures are flush or recessed below the inlet face.

The frame may comprise an annular band secured to the outer periphery of the filter media pack via an adhesive, with the annular band extending axially in spaced relation to the filter media pack defining a potting well therebetween. The adhesive can be disposed in the potting well, with the frame including an annular shutoff lip closing the potting well at bottom of the annular band. Preferably, the adhesive comprises urethane material.

Preferably, the handle structures are unitary with the annular band of a frame.

The frame can include a seal support flange extending radially from the annular band, with the gasket being a dust seal mounted around the seal support flange to cover top bottom and outer sides.

The frame may comprise an annular band secured to the outer periphery of the filter media pack, with the annular band having an outer peripheral face facing radially outward, and with the gasket circumscribing and mounted to the outer peripheral face, and wherein the filter media pack comprises a pleated filter panel. This may provide a secondary filter element configuration.

On opposite sides the frame may further include handle mount blocks along an inner periphery of the annular band, with each handle structure comprises a resilient handle including a mounting base integrally formed and welded to one of the mounting blocks and a handle strap extending therefrom that lies substantially flat with the inlet face and that is resilient pivotable from the mounting base to be grasped.

The frame may comprise an annular band secured to the outer periphery of the filter media pack via an adhesive, with the annular band extending axially with the handle structures extending axially therefrom and in spaced relation to the filter media pack to define a radial clearance region configured for handle manipulation. The gasket may circumscribe a radially outward facing face of the annular band.

While other media packs may be used for a mass of media, preferably the filter media comprises a gathered sheet of fibrous filter media, with the gathered sheet comprising being at least one of a pleated panel filter configuration and a fluted filter pack configuration wherein fluted media is secured to facing media.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 6 is an isometric and cross-sectional view of a secondary air filter element usable downstream in fluidic series of the primary air filter of FIG. 1, and according to a second illustrated embodiment of the present invention;

FIG. 7 is a top view of the air filter shown in FIG. 6;

FIG. 8 is a cross-sectional view of the air filter element of FIG. 7 taken about line A-A;

FIG. 9 is a side view of the air filter shown in FIG. 6;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
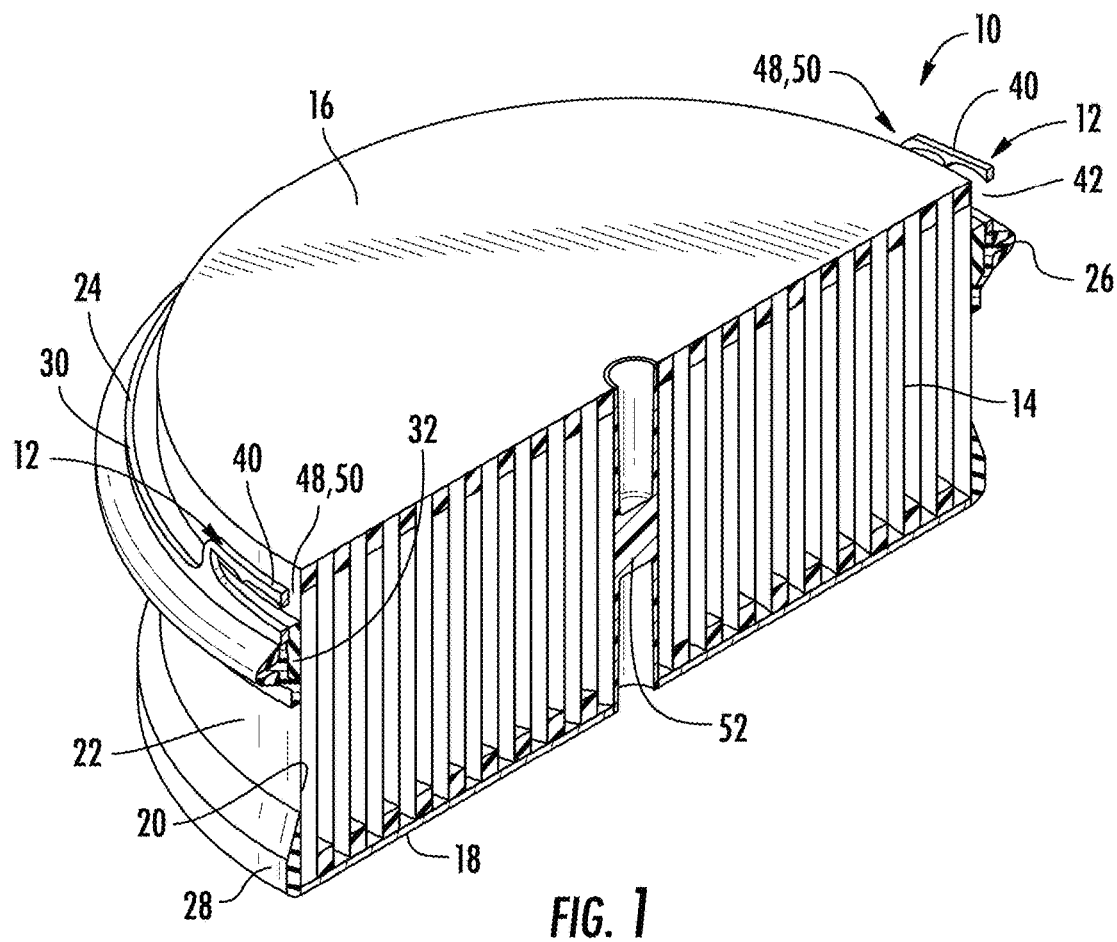
FIG. 1 is an isometric and cross-sectional view of a primary air filter element according to a first illustrated embodiment of the present invention.
Figure 2:
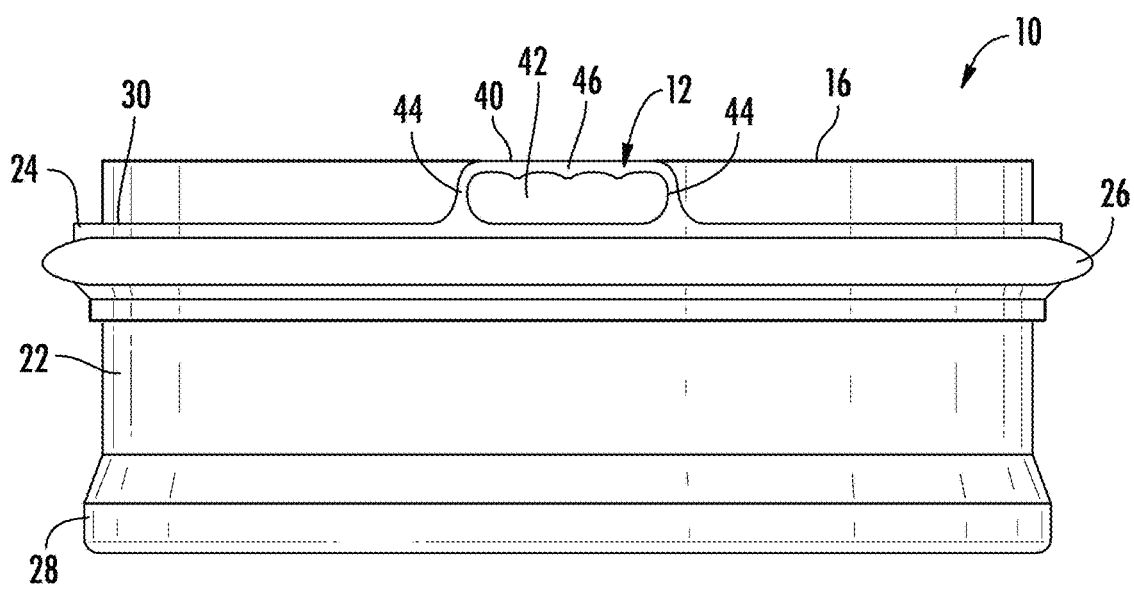
FIG. 2 is a side view of the air filter element of FIG. 1.
Figure 3:
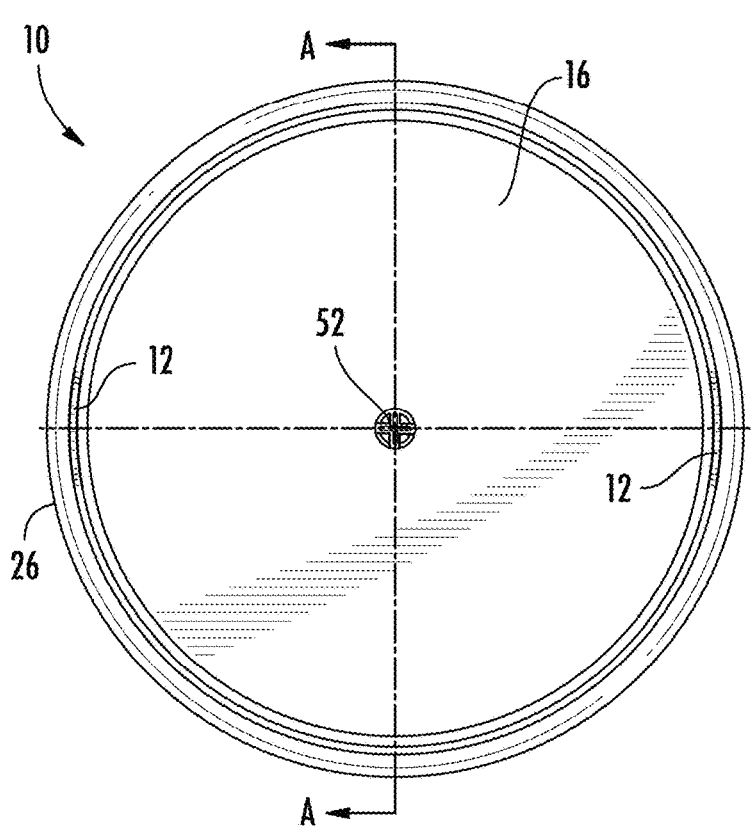
FIG. 3 is top view of the air filter element of FIG. 1.
Figure 4:
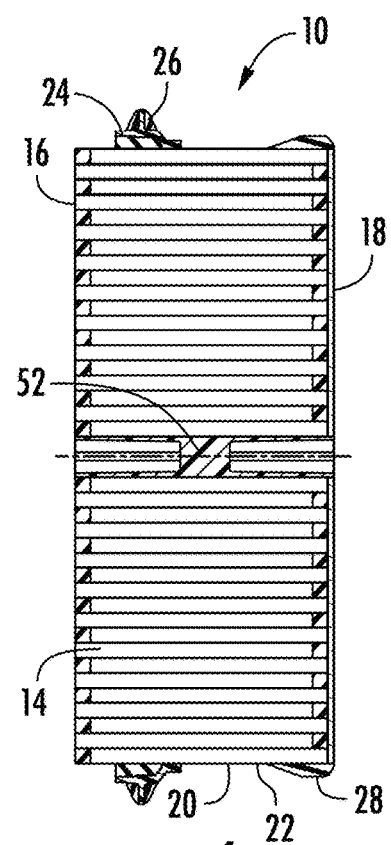
FIG. 4 is a cross-sectional view of the air filter element of FIG. 3 taken about line A-A.
Figure 5:
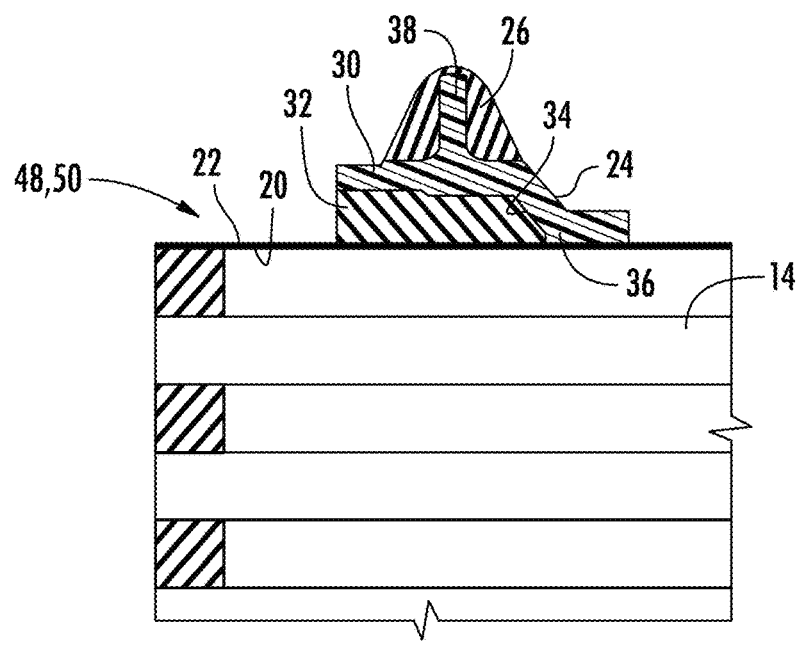
FIG. 5 is an enlarged view of a portion of FIG. 4.
Figure 10:
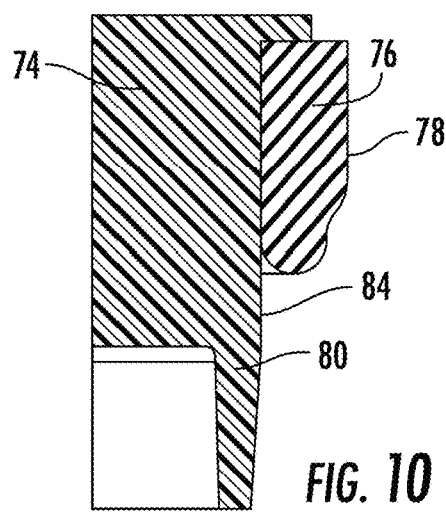
FIG. 10 is an enlarged view of a portion of FIG. 8.

Turning to FIG. 1, an air filter element 10 with an improved handle structure in the form of a pair of handles 12 is illustrated in accordance with a first embodiment of the present invention. The air filter element 10 includes a mass of media such as a filter media pack 14 comprising a suitable air filter media (e.g. typically non-woven fibrous media of cellulose and/or synthetic polymeric fibers in a sheet). The filter media pack 14 defines an inlet face 16, an outlet face 18 and an outer periphery 20 that is an annular side (e.g. cylindrical outer wall in the present embodiment). The outer periphery 20 faces radially outward and extends axially between the inlet face 16 and the outlet face 18 to provide a filtered fluid flow path extending axially from the inlet face to the outlet face and through the air filter media for contaminant removal. This may be considered to be an axial flow type filter (also referenced as an inline filter, in that the air can pass through the faces generally along the same direction).

The filter media pack 14 in this embodiment is preferably a fluted filter media pack, which is known in the art to comprise a fluted sheet and a facing sheet that are secured together to define inlet flutes occluded a the outlet end and outlet flutes occluded at the inlet end so that unfiltered air must pass through one of the sheets of filter media to remove contaminants from the airflow. For example, a suitable fluted filter media pack and method of manufacture useable for the media pack herein is shown for example in the aforementioned U.S. Pat. No. 8,083,825 to Mosset et al. and/or U.S. Pat. No. 7,255,300 to Johnston et al. entitled "Method and apparatus for winding a filter media pack," which is also incorporated by reference in its entirety.

Optionally but preferably, an outer wrapper 22 such as provided in US 2019/0105593 and entitled "Surface Coated Filter Method" may be utilized. For example, outer wrapper 22 may be an integrally formed outer layer such as by spray or roller coating of polyurea material, however adhesively attached preformed wrappers of plastic sheet and/or of porous material such as a spun-bounded sheet may be used.

The air filter element 10 includes a frame 24 secured to the filter media pack 14 and in surrounding relation of the outer periphery 20. For example, the filter media pack 14 can be secured to the frame 24 through an annular adhesive of polyurethane that attaches the frame 14 through the outer wrapper 22.

The frame is preferably a rigid structure such as made from rigid plastic and preferably nylon reinforced with glass fibers.

The frame 24 can comprise an annular band 30 secured to the outer periphery 20 of the filter media pack via an adhesive 32. The annular band 30 extends axially but in radially spaced relation to the filter media pack 14 to define a potting well 34 therebetween, with the adhesive 32 being disposed in the potting well 34 for securement. The frame 24 may also include an annular shutoff lip 36 closing the potting well 34 at bottom of the annular band 30 while leaving an adequate fillable entrance region at the top for receipt of the adhesive, which is preferably a curable resin such as urethane that can also seal between the annular band and the filter media pack.

Further, preferably, the air filter element 10 includes a seal ring such as provided by a gasket 26 that is arranged in surrounding relation of the filter media pack 14. As illustrated, the gasket 26 may be supported by and mounted on the frame 24.

In this embodiment, the gasket 26 is considered a "dust seal" in that it serves to prevent dust penetrating along the side during use to help for cleaner change-out and/or as a back-up for a primary seal provided by radial seal gasket 28 secured proximate the outlet face 18. The dust seal type gasket 26 may be arranged proximate the inlet face 16 as illustrated. As shown, the gasket 26 is preferably an axial seal gasket but may alternatively be a radial seal like radial seal gasket 28, or as is the case in the second embodiment of FIGS. 6-10.

Further, the frame 24 can include a seal support flange 38 extending radially outwardly from the annular band 30. The gasket 26 (e.g. a dust seal) can be mounted around the seal support flange 38 to cover top bottom and outer sides thereof. As illustrated, the gasket 26 circumscribes a radially outward facing face of the annular band 30.

Secured to the frame 24 is a handle structure such as provided by the handles 12. The handles 12 can be secured to the frame integrally such as being unitarily molded therewith as single monolithic structure.

The handles 12 can be grasped by the service mechanic to assist with installation and/or removal and are preferably sized large enough to receive two or more fingers of a mechanics hand therethrough, often typically with gloves upon the fingers. To provide such functionality, each of the handles 12 include handle aperture 42 having a horizontal length of between 5 and 20 centimeters and a vertical/axial width of between 2 and 10 centimeters to provide for manual grasping manipulation. To provide the aperture, the handles may be in the form of a closed loop strap with vertical legs 44 extending integral with the annular band 30 and a connecting bar 46 extending horizontally and connected tops of the vertical legs 44. The connecting bar 46 can provide for the handle top 40 that can be arranged in a preferred location relative to the inlet face.

While providing functionality for handling, the handles 12 can also be arranged to provide for space savings and yet apply the force directly proximate to the periphery where the frame is located for reliable manipulation. As shown, the handles 12 are secured to the frame 24 proximate the outer periphery 20, with the handle structures extending to a region inside of an outer perimeter of the gasket 26, and the handles are primarily contained between the inlet face 16 and the outlet face 18 in that a majority of the axial span of the handle is disposed between inlet and outlet faces 16, 18. Preferably, a top 40 of the handles 12 are generally flush with the inlet face. In certain arrangements, the handle top 40 can be positioned to provide stop structure to coact and/or abut with a corresponding air cleaner housing surface for proper positioning therein. Also, by having this arrangement, space savings can be realized, while providing a good and reliable handle structure for grasping. By "generally flush" or "generally flat" or similarly, it is meant that it may be flush/coplanar or within 2 centimeters of being flush/coplanar.

Space savings may also be realized by the perimeter occupied. The handle structures are interposed in an annular region 48 between the gasket 26 and the filter media pack 14 and extend axially along the outer periphery 20 generally parallel therewith (generally parallel being parallel or within 20 degrees of parallel), and with a radial air gap 50 providing a radial clearance region between the handle 12 and the pack 14 to allow a user to easily maneuver ones hand into the handle. Also as noted, the handle structures are preferably flush with or recessed below the inlet flow face 16. Finally, the handle structures need not interact with the winder core 52 used for winding a fluted type filter media pack 14, and force can be more directly applied to the seal support frame at the periphery rather than at a center region.

Turning to a second illustrated embodiment FIGS. 6-10, a secondary air filter element 60 is illustrated, which may be usable in fluidic series with the primary air filter element 10 of the first embodiment. This second air filter element 60 also may incorporate an improved handle 62. In this second embodiment, the air filter element 60 also comprises a filter media pack 64 comprising an air filter media and having an inlet face 66, an outlet face 68 and an outer periphery 70. Similarly, the outer periphery 70 extends between the inlet face 66 and the outlet face 68, to provide a filtered fluid flow path extending axially from the inlet face to the outlet face and through the air filter media for contaminant removal. However, in this embodiment, the air filter media preferably is in the form of a pleated sheet 72 having folds with creased pleat tips at the inlet and outlet faces, but it is also an axial and inline direct flow filter arrangement like the first embodiment, just that the filter media sheet is configured and gathered differently. This type of filter pack is sometimes referred to as a pleated panel filter.

This air filter element 60 includes a frame 74 secured to the outer periphery 70 of the filter media pack 64 and in surrounding relation of the outer periphery 70. Also, a gasket 76 is arranged in surrounding relation of the filter media pack 64 and that is preferably a radial seal gasket having an outer radial seal surface 78 that is compressible radially for radially sealing with a housing.

The handles 62 are secured to the frame 74 proximate the outer periphery 70, with the handle structures similarly extending to a region inside of an outer perimeter of the gasket 76. Here however, the handles 62 structures lying substantially flat with the inlet face 66 across and over the inlet face 66.

The handles 62 are pivotable structures secured integral with the frame 74, with the handles being sufficiently thin and flexible to provide an integral hinge 86. The frame 74 can comprise an annular band 80 sealingly secured to the outer periphery 70 of the of the filter media pack 64 such as with an annular application of adhesive 82 therebetween. The annular band 80 has an outer peripheral face 84 facing radially outward, with the gasket 76 circumscribing and mounted to the outer peripheral face 84.

To provide for convenient manufacture, on opposite sides the frame further includes handle mount blocks 88 along an inner periphery of the annular band 80. The blocks 88 may define slits 90 that receive tabs 91 of the handles 62 with an integral arrangement such as via bonding or welding (e.g. sonic application or heat staking) to secure the handles in place. Such slits and tabs may also take the form of cylindrical pins and receiving holes. Each handle 62 can comprise a resilient handle loop 94 to provide a handle aperture 92. The loops 94 extend from a mounting base 96 (that includes insertion tab 91), with the base preferably integrally formed such as being welded to one of the mounting blocks 88. The loop 94 can provide a handle strap extending therefrom that lies substantially flat with the inlet face 66 when installed, thereby not occupying space, but is resilient pivotable from the mounting base via the flexibility allowed in the thinness of material at the hinges 86 to provide clearance to be grasped when pivoted.

Turning to a third embodiment of the present invention, FIGS. 11-16 illustrate a primary air filter element 110 with an alternative handle arrangement to that of the first embodiment of FIGS. 1-5. However, this third embodiment is otherwise the same as the first embodiment such that the same reference numbers are used for the same structures, and it is understood that the description for the first embodiment is fully applicable to this embodiment other than as indicated.

The air filter element 110 of FIGS. 11-16 also includes the same fluted filter media pack 14 with inlet face 16, outlet face 18 and outer periphery 20, as well as the same axial seal gasket 26 and radial seal gasket 28. Optional outer wrapper 22 may also be employed.

The frame 124 is mostly the same in that it also includes annular band 130 adhesively mounted in the same way such as via a urethane pour, however, the handle structures in this embodiment are in the form of handle mounts provided by vertically and axially projecting ears 112 that project from the annular band 130. The ears 112 pivotably support a bail handle 146 that is pivotably mounted to the pair support ears 112.

Figure 11:
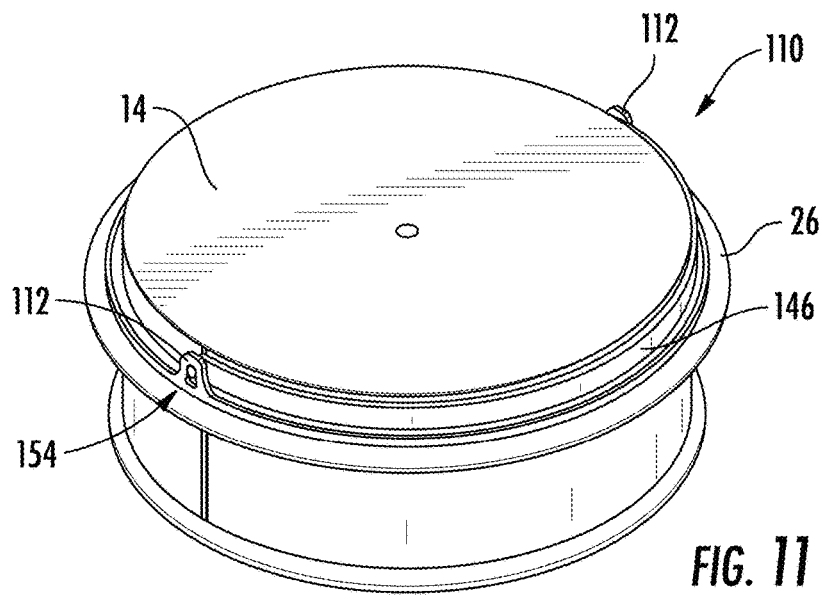
FIG. 11 is an isometric view of a primary air filter element according to a third illustrated embodiment of the present invention.
Figure 12:
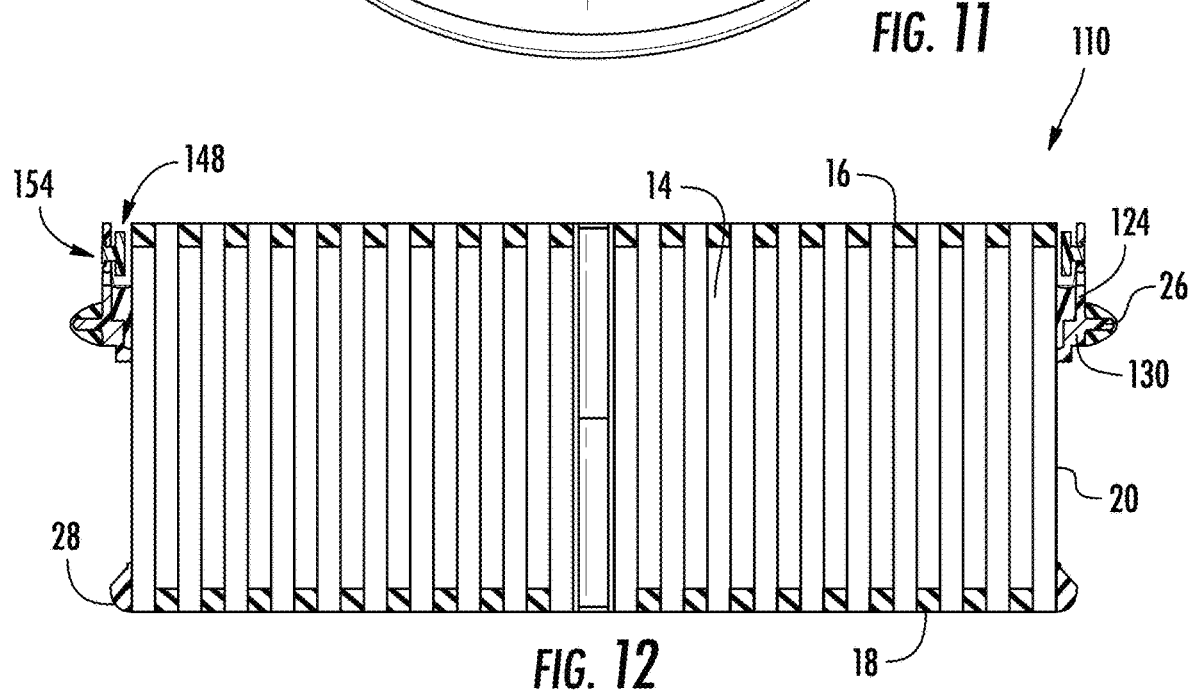
FIG. 12 is a cross sectional view of the air filter element shown in FIG. 11.
Figure 13:
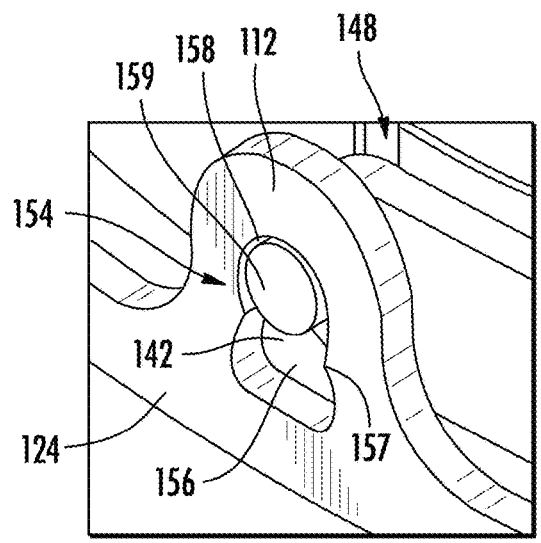
FIG. 13 is an enlarged isometric view of the bail handle connection illustrated in FIG. 11.
Figure 14:
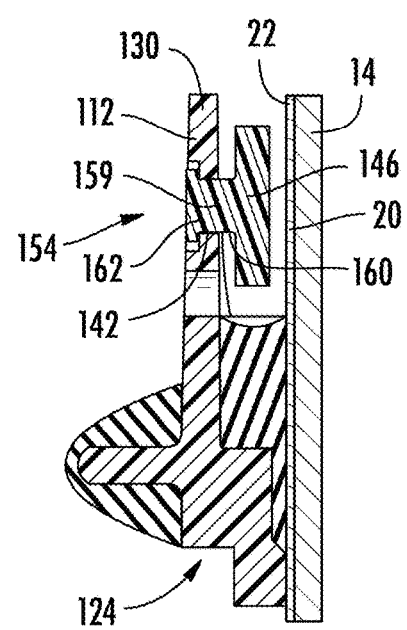
FIG. 14 is an enlarged view of a portion of FIG. 12.
Figure 15:
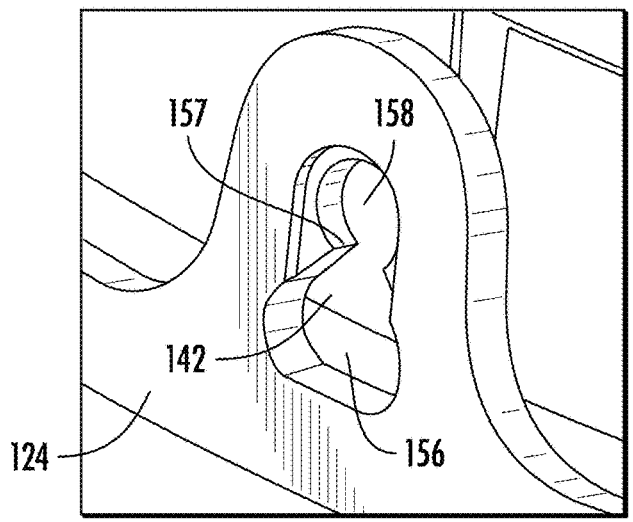
FIG. 15 is an enlarged view of the handle structure in the form of handled mount of the embodiment of FIG. 11.
Figure 16:
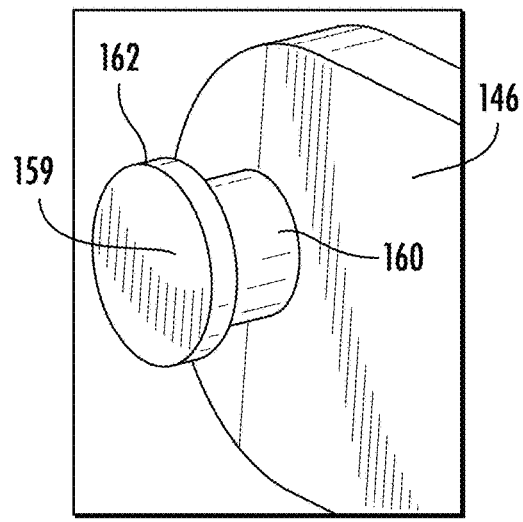
FIG. 16 is an enlarged view of the mounting end of the bail handle of the embodiment of FIG. 11.

The bail handle 146 is pivotable between an extended position providing a loop over the inlet face 16 for manual manipulation and a retracted position in which the bail handle is generally flush or below the inlet face 16, with the retracted position show in FIGS. 11 and 12. An annular clearance region 148 is defined radially between the frame 124 and the filter media pack 14. As shown best in FIGS. 11 and 12, the bail handle in the retracted position occupies the annular clearance region 148, and in particular the bail handle can be retracted to one side or the other side of the support ears 112 due to symmetry.

To provide for a pivotable connection, a hinge structure 154 is provided and may be formed between ends of the bail handle 146 and the support ears 112. For example, each of the ears 112 may have apertures 142 (which may include an insert slot 156 and a pivot aperture 158, with a snap project rib 157 therebetween), while the bail handle 146 may have pivot projections 159 including a neck portion 160 and a retainer head portion 162. For assembly, the pivot projections 159 can be assembled due to the resiliently flexible nature of the bail handle 146 due to its length and thinness (which also may be a molded plastic member), with the head portions 162 insertable into the enlarged insert slot 156 and with the neck portions 160 then snapped and slid past the snap rib 157 to position the neck regions in the pivot aperture 158 and retained therein due to the enlarged head portion 162 being larger than the pivot aperture 142). As such the bail handle 146 comprises a pair of projections snap fit into respective apertures of the support ears.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air filter element, comprising:
   a filter media pack comprising an air filter media and having an inlet face, an outlet face and an outer periphery, the outer periphery extending between the inlet face and the outlet face, a filtered fluid flow path extending axially from the inlet face to the outlet face and through the air filter media for contaminant removal;
   a frame secured to the filter media pack and in surrounding relation of the outer periphery;
   a gasket arranged in surrounding relation of the filter media pack;
   a plurality of handle structures secured to the frame, the handle structures extending to a region inside of an outer perimeter of the gasket; and
   wherein the frame comprises an annular band secured to the outer periphery of the filter media pack via an adhesive, the annular band extending axially in spaced relation to the filter media pack defining a potting well therebetween, the adhesive being disposed in the potting well, the frame including an annular shutoff lip closing the potting well at bottom of the annular band.

2. The air filter element of claim 1, wherein a top of the handle structures is generally flush with the inlet face.

3. The air filter element of claim 1, wherein the handle structures are interposed in an annular region between the gasket and the filter media pack and extend axially along the outer periphery generally parallel therewith and in spaced relation to the filter media pack with an air gap therebetween, with generally parallel being parallel or within 20 degrees of parallel.

4. The air filter element of claim 1, wherein a portion of the handle structures is generally flush with the inlet face, generally flush being flush or within 2 centimeters of being flush.

5. The air filter element of claim 4, wherein the top of the handle structures provides mechanical stop means for proper installing and positioning of the air filter element.

6. The air filter element of claim 1, wherein each of the handle structures is a handle defining an aperture having a length of between 5 and 20 centimeters and a width of between 2 and 10 centimeters to provide for manual grasping manipulation.

7. The air filter element of claim 1, wherein the handle structures are flush or recessed below the inlet face.

8. The air filter element of claim 1, wherein the adhesive comprises urethane material.

9. The air filter element of claim 1, wherein the handle structures are unitary with the annular band.

10. The air filter element of claim 1, wherein the frame includes a seal support flange extending radially from the annular band, the gasket being a dust seal mounted around the seal support flange to cover top bottom and outer sides.

11. The air filter element of claim 1, wherein the frame comprises an annular band secured to the outer periphery of the filter media pack via an adhesive, the annular band extending axially with the handle structures extending axially therefrom and in spaced relation to the filter media pack to define a radial clearance region configured for handle manipulation, wherein the gasket circumscribes a radially outward facing face of the annular band.

12. The air filter element of claim 1, wherein the air filter media comprises a gathered sheet of fibrous filter media, the gathered sheet comprising being a fluted filter pack configuration wherein fluted media is secured to facing media.

13. An air filter element, comprising:
   a filter media pack comprising an air filter media and having an inlet face, an outlet face and an outer periphery, the outer periphery extending between the inlet face and the outlet face, a filtered fluid flow path extending axially from the inlet face to the outlet face and through the air filter media for contaminant removal;
   a frame secured to the filter media pack and in surrounding relation of the outer periphery;
   a gasket arranged in surrounding relation of the filter media pack;
   a handle structure secured to the frame proximate the outer periphery, the handle structure extending to a region inside of an outer perimeter of the gasket, wherein the handle structure lies substantially flat with the inlet face and extend across the inlet face, wherein the handle structure comprises a pivotable handle secured integral with the frame, the pivotable handle being sufficiently thin and flexible to provide an integral hinge; and
   a first handle mounting block along an inner periphery of the frame and positioned along an outer periphery of the filter media pack between the inlet face and the outlet face, wherein the pivotable handle comprises a mounting base integral with the first handle mounting block.

14. The air filter element of claim 13, wherein the frame comprises an annular band secured to the outer periphery of the filter media pack, and the annular band having an outer peripheral face facing radially outward, the gasket circumscribing and mounted to the outer peripheral face, and wherein the filter media pack comprises a pleated filter panel.

15. The air filter element of claim 14, wherein on opposite sides the frame further includes a pair of handle mount blocks along an inner periphery of the annular band, the pair of handle mount blocks including the first handle mounting block and a second handle mounting block, the second handle mounting block along the inner periphery of the frame and positioned along the outer periphery of the filter media pack between the inlet face and the outlet face, the pivotable handle being in the form of a pair of handle straps, each handle strap extending from one of the pair of handle mount blocks to lie substantially flat with the inlet face and is resilient pivotable from the handle mount blocks to be grasped.

16. An air filter element, comprising:
   a filter media pack comprising an air filter media and having an inlet face, an outlet face and an outer periphery, the outer periphery extending between the inlet face and the outlet face, a filtered fluid flow path extending axially from the inlet face to the outlet face and through the air filter media for contaminant removal;

a frame secured to the filter media pack and in surrounding relation of the outer periphery;

a gasket arranged in surrounding relation of the filter media pack;

a plurality of handle structures secured to the frame proximate the outer periphery, the handle structures extending to a region inside of an outer perimeter of the gasket, and the handle structures are primarily contained between the inlet face and the outlet face; and wherein the handle structures comprises a pair of handle mounts including support ears extending from an annular band of the frame, and further a bail handle pivotably mounted to the support ears.

17. The air filter element of claim 16, wherein the bail handle is pivotable between an extended position providing a loop over the inlet face for manual manipulation and a retracted position in which the bail handle is generally flush or below the inlet face.

18. The air filter element of claim 17, wherein an annular clearance region is defined radially between the frame and the filter media pack, wherein the bail handle in the retracted position occupies the annular clearance region, and wherein the bail handle comprises a pair of projections snap fit into respective apertures of the support ears.

19. An air filter element including: i) a filter media pack comprising an air filter media to provide a mass of media having an inlet face at one end and an outlet face at another end, and ii) a frame fixed to and circumferentially surrounding the media around the outer periphery thereof, the frame including an annular body portion and a pair of handles formed integrally with the annular body portion, wherein the handles are located and sized for grasping by a user to remove the air filter element from a housing; and wherein the annular body portion comprises an annular band secured to the outer periphery of the filter media pack via an adhesive, the annular band extending axially in spaced relation to the filter media pack defining a potting well therebetween, the adhesive being disposed in the potting well, the frame including an annular shutoff lip closing the potting well at bottom of the annular band, the annular body portion also including a seal support flange supporting an annular gasket, the handles extending to a region inside of an outer perimeter of the annular gasket.

20. The air filter element as in claim 19, wherein the handles are unitary with the annular body portion.

21. The air filter element as in claim 19, further including a gasket supported by the frame and circumferentially surrounding the frame.

22. An air filter element including: i) a filter media pack comprising an air filter media to provide a mass of media having an inlet face at one end and an outlet face at another end, and ii) a frame fixed to and circumferentially surrounding the media around the outer periphery thereof, the frame including an annular body portion and a handle formed supported by annular body portion and projecting freely across one of the ends of the element, wherein the handle is located and sized for grasping by a user to remove the air filter element from a housing, wherein the annular body portion comprises an annular band secured to the outer periphery of the filter media pack, and the annular band having an outer peripheral face facing radially outward, a gasket circumscribing and mounted to the outer peripheral face, and wherein the filter media pack comprises a pleated filter panel, and further comprising a first handle mounting block along an inner periphery of the annular band and positioned along an outer periphery of the filter media pack between the inlet face and the outlet face, wherein the handle projects from the first mounting block.

23. The air filter element of claim 22, wherein on opposite sides the frame a pair of handle mount blocks are provided along an inner periphery of the annular band on opposite sides thereof, the pair of handle mount blocks including said first handle mounting block and a second handle mounting block in spaced relation with the pleated filter media panel therebetween, each of the handle mount blocks having a handle strap extending therefrom that lies substantially flat with the inlet face and is resilient pivotable from the mounting base to be grasped, the handle strap of the first handle mounting block providing said handle thereof.

24. An air filter element including i) a filter media pack comprising an air filter media to provide a mass of media having an inlet face at one end and an outlet face at another end and surrounding a central core, and ii) a dust seal assembly circumferentially surrounding the mass of media along an outer surface thereof, the dust seal assembly including a frame fixed to the outer surface, and at least one handle structure formed integrally with an annular body portion of the frame and projecting freely from the annular body portion; and wherein the frame comprises an annular band secured to the outer periphery of the filter media pack via an adhesive, the annular band extending axially in spaced relation to the filter media pack defining a potting well therebetween, the adhesive being disposed in the potting well, the frame including an annular shutoff lip closing the potting well at bottom of the annular band.

25. The air filter element of claim 24, wherein the at least one handle structure comprises a pair of handles are located and sized for grasping by a user to remove the air filter element from a housing.

26. The air filter element of claim 24, wherein a top of the at least one handle structure is generally flush with the inlet face.

27. The air filter element of claim 24, wherein the adhesive comprises urethane material.

28. The air filter element of claim 24, wherein the at least one handle structure comprises a pair of handle structures unitary with the annular body portion.

29. The air filter element of claim 24, wherein the frame defines a central opening into with the filter media pack is received.

30. The air filter element of claim 29, wherein the frame circumscribes entirely around the outer periphery of the filter media pack.

31. An air filter element including i) a filter media pack comprising an air filter media to provide a mass of media having an inlet face at one end and an outlet face at another end and surrounding a central core, and ii) a dust seal assembly circumferentially surrounding the mass of media along an outer surface thereof, the dust seal assembly including a frame fixed to the outer surface, and at least one handle structure formed integrally with an annular body portion of the frame and projecting freely from the annular body portion toward one of the ends of the air filter element; and wherein the at least one handle structure comprises a pair of handle mounts including support ears extending from an annular band of the frame, and further a bail handle pivotably mounted to the pair support ears.

32. The air filter element of claim 31, wherein the bail handle is pivotable between an extended position providing a loop over the inlet face for manual manipulation and a retracted position in which the bail handle is generally flush or below the inlet face.

33. An air filter element including i) a filter media pack comprising an air filter media to provide a mass of media having an inlet face at one end and an outlet face at another end and surrounding a central core, and ii) a dust seal assembly circumferentially surrounding the mass of media along an outer surface thereof, the dust seal assembly including a frame fixed to the outer surface, and at least one handle structure formed integrally with an annular body portion of the frame and projecting freely from the annular body portion; and wherein the frame includes a seal support flange extending radially from the annular body portion, the dust seal assembly including gasket being a dust seal mounted around the seal support flange to cover a top, a bottom and an outer periphery of the seal support flange.

\* \* \* \* \*